3,197,289
MODIFICATION OF ZINC HYDROSULFITE CRYSTALS BY USE OF HIGH MOLECULAR WEIGHT COLLOIDAL MATERIALS
Thomas E. Rogers, Ho-Ho-Kus, N.J., assignor to Nopco Chemical Company, a corporation of New Jersey
No Drawing. Filed Dec. 11, 1961, Ser. No. 158,604
20 Claims. (Cl. 23—300)

This invention relates to the production of zinc hydrosulfite. More particularly it relates to the production of zinc hydrosulfite in the form of large crystals which are readily useable in the paper and textile industries.

It is well known that zinc hydrosulfite is extremely useful as a bleaching and stripping agent in the paper and textile industry. However, zinc hydrosulfite when produced by conventional procedures is in the form of a very fine powder which creates a very high dusting and bridging effect when it is used in paper, textile and chemical applications. The high dusting effect when such powders are used is extremely undesirable due to the health hazards which are created. Inhalation of large quantities of zinc hydrosulfite dust will cause serious nosebleeds and other respiratory ailments. The dusting tends to make the plant very dirty and renders feeding and dispersing of zinc hydrosulfite into reaction systems very difficult. The fine powdery form of the zinc hydrosulfite when produced in the procedures employed by the prior art causes the zinc hydrosulfite to fail to flow or feed out of a hopper unless the hopper is constantly agitated. This results in a non-uniform flow of zinc hydrosulfite and may cause serious irregularities in the process in which the zinc hydrosulfite is used.

In order to avoid these severe dusting and bridging effects, some in the prior art have even resorted to the use of zinc chloride as a salting out agent to enhance both the yield and crystal formation of zinc hydrosulfite. However, when zinc chloride is used as a salting out agent in the crystallization of zinc hydrosulfite, special safety precautions must be taken because zinc chloride is extremely hazardous to use since it is extremely caustic. Furthermore, when zinc chloride is used as a salting out agent it tends to decompose the zinc hydrosulfite due to the fact that it is rather acid when it is in solution. Zinc hydrosulfite, which has been salted out from an aqueous solution using zinc chloride as a salting out agent tends to be in the form of a fine powder which does not overcome the dusting and bridging effects inherent in other prior art processes.

It is the object of this invention to provide a new and improved method for the production of zinc hydrosulfite.

Another object of this invention is to provide a method for producing zinc hydrosulfite by an efficient, economical process in a crystalline form that will greatly enhance its usefulness in the textile, paper and chemical industries.

A still further object of this invention is to provide zinc hydrosulfite in improved form, namely cystals having a crystal substantially increased size and/or modified in habit.

Other objects of this invention will in part be obvious and will in part appear hereinafter.

In my copending application, Serial No. 96,345, T. Rogers, filed March 17, 1961, now Patent No. 3,048,477, I have described a process wherein improved zinc hydrosulfite crystals have been obtained by the use of glycerine. I have now unexpectedly discovered that further improved zinc hydrosulfite crystals can be obtained by utilizing in connection with my aforesaid process, crystal modifiers which can be described as organic, polymeric, water soluble to water dispersible, high molecular weight colloidal substances used by others skilled in the art as flocculating agents. Hereinafter my additives shall be referred to simply as "crystal modifiers." As a result of this invention, I am able to obtain larger, more stable and purer zinc hydrosulfite crystals which are substantially increased in size over crystals produced when the process disclosed in my copending application No. 96,345, now Patent No. 3,048,477, is utilized.

The process disclosed in this invention is briefly described as the steps of treating an aqueous solution of zinc hydrosulfite with glycerine, a pH stabilizing agent such as zinc dust, zinc oxide, zinc carbonate, and/or other basic zinc-containing compounds and mixtures thereof, and a very small amount of crystal modifier; concentrating the solution by removing water at a controlled rate from the aqueous solution of zinc hydrosulfite, until essentially all of the zinc hydrosulfite contained in the treated solution has crystallized out of the solution and thereafter recovering the zinc hydrosulfite crystals.

The crystal modifiers found useful in my invention to produce improved crystals of zinc hydrosulfite are organic, polymeric, water soluble to water dispersible, high molecular weight, colloidal substances which are well known and used by others skilled in the art as flocculating agents. However, it is to be fully understood that when these flocculating agents are employed in my novel process they do not act as such per se, that is to say they do not cause crystal particles in the system to agglomerate, but they strongly inhibit further nucleation of crystals, and thereby allowing for an increase in the working concentration of the solution thus facilitating the abnormal growth in size of the crystals produced by the system. The crystals produced in the process of my invention are also further modified in that their normal crystal habit, a hexagonal needle, is changed to a rectangular needle. However, the crystal habit of all individual crystals produced in my novel process is not changed for the zinc hydrosulfite crystals produced by my invention normally contain a mixture of both forms. The phenomena whereby such large crystals of zinc hydrosulfite are produced by the use of flocculating agents as crystal modifiers is not completely understood. However, it is believed that the effects noted above are in general attributed to the various physical changes in the growth of the crystal produced by the use of the flocculating agents as crystal modifiers.

Exemplary of crystal modifiers found useful in my invention are polymers of acrylamide having a molecular weight ranging between from about 500,000 and to about 4,000,000. Exemplary of these are polyacrylamide having a molecular weight of about 1,000,000 sold by Dow Chemical Company as "Separan NP–10" and polyacrylamide having a molecular weight of about 2,000,000 sold by Dow Chemical Company as "Separan NP–20"; copolymers of acrylamide and acrylonitrile having a molecular weight ranging between from about 500,000 to about 9,000,000; gum resins having a molecular weight ranging between from about 300,000 to about 9,000,000 such as gum karaya and locust bean gum; polymers of ethers of cellulose having a molecular weight ranging between from about 500,000 to about 4,000,000 such as polymeric hydroxyethyl cellulose sold by Union Carbide Chemical Company, under "Cellosize QP4400" and the like. The methods of preparing such compounds are well known to persons skilled in the art and the molecular weights of such polymers may easily be determined by employing any of the following methods, Svedberg ultracentrafugation method, Tiselius electrophoresis method, molecular diffusion method and/or osmotic pressure method, which are all well known methods of determining the molecular weight of polymers of this magnitude. These examples are given merely to illustrate the various crystal modifiers that are useable in my invention and my invention is not limited to these since any other flocculating agents can be used as crystal modifiers.

In the preferred embodiment of my invention an aqueous solution containing zinc hydrosulfite is first filtered to remove impurities and then separated into two approximately equal portions. One portion is placed in a holding tank. Approximately one-half of the total amount of the crystal modifier is introduced into the other portion of the zinc hydrosulfite solution. This portion which now contains the crystal modifier is then placed in any suitable apparatus such as crystallizer-concentrator and glycerine and a pH stabilizer are introduced therein. Thereafter this portion of zinc hydrosulfite solution is concentrated by the application of heat and vacuum to approximately 80% of the initial volume of this portion.

To the unconcentrated portion in the holding tank, the remaining approximately one-half of my additive is introduced. Thereafter both portions are consoliated at a controlled rate, that is, the unconcentrated portion is added to the concentrated portion while removing water from the resulting mixture at a rate equivalent to the rate of addition of the unconcentrated portion to the concentrated portion. Finally the zinc hydrosulfite crystals produced therein are recovered.

The aqueous solution containing the zinc hydrosulfite can be prepared by dissolving zinc hydrosulfite into water or it can be the aqueous solution resulting from the preparation of zinc hydrosulfite. Thus it is readily apparent that this invention can be advantageously utilized directly in the production of zinc hydrosulfite merely by eliminating the prior art recovery steps and substituting therefor the process of this invention.

The practice of my invention is not limited by the manner of obtaining zinc hydrosulfite. This is because it is directed to the crystallization of zinc hydrosulfite from aqueous solutions containing zinc hydrosulfite and not to the preparation of zinc hydrosulfite itself. The methods of producing zinc hydrosulfite are well known in the art and involve the reaction of metallic zinc, water and sulphur dioxide in an aqueous medium. The zinc used in the preparation of the zinc hydrosulfite is usually in the form of a finely powdered zinc dispersed in an aqueous medium. The sulphur dioxide can be introduced into the zinc dispersion from a tank of gaseous sulphur dioxide or it may be introduced into the dispersion from a sulphur dioxide generator which utilizes burning sulphur to produce the sulphur dioxide. The aqueous dispersion containing the zinc should be constantly agitated during the addition of sulfur dioxide in order to assure a more complete reaction of the reactants. Upon completion of the reaction, the resulting zinc hydrosulfite is in solution and is ready to be crystallized therefrom.

In carrying out this invention, the aqueous solution of zinc hydrosulfite should contain from about 35 percent to about 75 percent by weight of zinc hydrosulfite, or at least about 25 percent water based on the total weight of the solution. More dilute aqueous solutions of zinc hydrosulfite may be used, but for purposes of economy it is desirable to use aqueous solutions containing at least about 35 percent zinc hydrosulfite. It is believed that when aqueous solutions of zinc hydrosulfite containing more than about 75 percent by weight of zinc hydrosulfite are used, spontaneous nucleation occurs thus preventing the growth of large crystals. The zinc hydrosulfite is readily soluble in water at room temperature and aqueous solutions thereof may be prepared without need for any special equipment. In the preferred embodiment of my invention the aqueous solution should contain from about 35 percent to about 50 percent by weight of water based on the total weight of the solution. The pH of the aqueous solution should be maintained between about 3.6 and 4.4 and in the preferred embodiment of my invention the pH of the aqueous solution containing zinc hydrosulfite is about 4.0. If the pH of the solution is below about 3.6, metallic zinc dust, zinc oxide and other basic zinc-containing compounds and mixtures thereof may be added to the aqueous solution of zinc hydrosulfite to adjust the pH of the solution to within the range specified above.

The treatment of the aqueous solution of zinc hydrosulfite with glycerine and a pH stabilizing agent and my additives is carried out by dividing the solution into two approximately equal portions. Then, to one of the two portions, at least about 2% by weight of glycerine, based on the weight of the zinc hydrosulfite contained in this portion and from about 0.2% to about 0.8% by weight of a pH stabilizing agent, based on the weight of the zinc hydrosulfite contained in this portion are both introduced into this portion of the solution. In the preferred embodiment of my invention I add to one of the two portions approximately 10% by weight of glycerine based on the weight of zinc hydrosulfite contained in this portion and approximately 0.4% by weight of a pH stabilizing agent, based on the weight of the zinc hydrosulfite contained in this portion. Greater amounts of glycerine may be employed if it is desired. However, no beneficial effects will be gained from employing amounts of glycerine greater than about 10 percent. Then from about 0.005% to about 0.1% by weight of crystal modifier, based on the weight of zinc hydrosulfite contained in the portion to which it is to be added, is added to each portion. Preferably, 0.01% by weight of crystal modifier, based on the weight of zinc hydrosulfite contained in the portion to which it is to be added, is added to each portion. Greater amounts of my crystal modifiers may be employed if it is so desired. However, when greater amounts are used, the beneficial results of this invention will be diminished in scope.

The order of admixing the glycerine, pH stabilizing agent and crystal modifiers is not critical. The glycerine, pH stabilizing agent and crystal modifier may be mixed directly with water and thereafter one-half of the zinc hydrosulfite to be crystallized may be added to the aqueous solution, or the glycerine, pH stabilizing agent and crystal modifier may be added directly to an aqueous solution of one-half of the zinc hydrosulfite to be crystallized. The latter procedure is particularly advantageous when my invention is directly applied to the recovery of commercially prepared zinc hydrosulfite. The aqueous solution containing zinc hydrosulfite should be agitated during addition of the glycerine, pH stabilizing agent and crystal modifier in order to completely mix the glycerine, pH stabilizing agent and crystal modifier into the solution. This portion is then preconcentrated at a temperature ranging from 45° C. to about 75° C. until this portion is reduced to about 80% of its original volume by the removal of water therefrom. Preferably this preconcentration is carried out at a temperature ranging from about 45° C. to about 48° C. under vacuum, the vacuum being employed here to merely increase the rate of concentration in order to render the process more economical. A subatmospheric pressure is selected which is convenient to achieve the foregoing economic desiderate and the rate of concentration is not critical during this step. The temperature of the preconcentrated portion is adjusted to temperatures ranging from between 63° C. to about 75° C., preferably at a temperature about 63° C. The preconcentrate is preferably held at this temperature for a few minutes. In the preferred embodiment of my invention the crystal modifier is now added in the amounts specified above. However it is to be understood that my invention is not limited to adding of crystal modifiers after the preconcentration has taken place, as it may be introduced as described above with the glycerine and the pH stabilizer. However the size of the crystals and the beneficial results of my invention are enhanced by this preferred procedure.

The temperature of the preconcentrated portion is adjusted to a temperature ranging between from about 55° C. to about 75° C. and in the preferred embodiment of my invention it is adjusted to 56.5° C. The temperature of this preconcentrate is maintained constant throughout the remainder of the crystallization of the zinc hydrosulfite. It is to be noted that seed crystals of zinc hydrosulfite will appear in the preconcentrate portion of the aqueous solution of zinc hydrosulfite when it has been reduced in volume to 80%. After the preconcentrate portion is prepared as aforesaid, the second portion of the mother liquor which has been treated with crystal modifier is slowly added to the preconcentrate portion while simultaneosuly removing water from the resulting admixture. The rate of removal of water from the two admixed portions must be approximately equal to the rate of addition of the second portion of the motor liquor to the preconcentrate portion of the mother liquor. Thus upon completion of the addition of the second portion of the mother liquor to the preconcentrate portion of the mother liquor, the volume of the mixed liquors is approximately equal to the volume of the preconcentrate portion of the mother liquor before the addition of the unconcentrated portion of the mother liquor was carried out. During the addition of the unconcentrated portion to the preconcentrated portion water may be removed by evaporation or distillation at temperatures ranging from about 55° C. to about 75° C. at subatmospheric pressure. In the preferred embodiment of my invention the water is removed at a temperature ranging about 56.5° C. at subatmospheric pressure. The unconcentrated portion of the mother liquor should be added to the preconcentrated portion of the mother liquor at a constant rate ranging from about 0.5% to about 1.33% by volume per minute based upon its total volume.

In the preferred embodiment of my invention the concentration of the mother liquor should be accomplished at a constant rate over a period ranging from about 2½ hours to about 3½ hours at the temperature, pressure and rates specified above. In the preferred embodiment of my invention the volume of the entire mother liquor is reduced to about 40 percent of its original volume in about 3 hours at a temperature of approximately 56.5° C. During the preconcentration of the preconcentrated portion of the mother liquor as well as during the concentration carried out when the unconcentrated portion is added to the preconcentrated portion, constant agitation is carried out to prevent formation of an unworkable mass of zinc hydrosulfite. The mixture of the two portions of the mother liquor is deemed sufficiently concentrated when the mixture appears as a thick viscous slurry. The subatmospheric pressures necessary to effect removal of water at the rate specified above will of course vary as the concentration of the aqueous solution containing the zinc hydrosulfite changes. It is well known that the vapor pressure of a solution is lower than the vapor pressure of the pure solvent, when the solute is a non-volatile solute such as zinc hydrosulfite. Thus it is readily apparent that during the concentration steps of the process disclosed in this invention that the degree of vacuum employed to effect removal of the water from the mother liquor must be increased as the concentration of the zinc hydrosulfite in the mother liquor increases. Thus the rates of concentration of the mother liquor as specified above can be easily maintained by regulation of the amount of vacuum applied to the system within the temperature ranges specified above. The use of subatmospheric pressures during the two concentration steps assures ready removal of the water at temperatures below 75° C. This is important since zinc hydrosulfite in an aqueous medium decomposes into other zinc-sulfur containing compounds such as zinc sulfite, zinc sulfide and zinc sulphate at temperature higher than 75° C. The regulation of the subatmospheric pressure is straightforward and is accomplished by using any vacuum producing apparatus such as a vacuum pump, or a steamjet evacuator.

The resulting concentrated mixture of the preconcentrated portion and the unconcentrated portion of the mother liquor may then optionally be treated with a solvent such as those that are used below in washing the zinc hydrosulfite crystals in order to give a more workable mass and to effect a displacement of water from the zinc hydrosulfite crystals contained in the concentrated mixture.

In the preferred embodiment of my invention the vacuum is broken on the resulting concentrated mixture of the preconcentrated portion and the unconcentrated portion of the mother liquor and the temperature of the admixture is adjusted to a temperature ranging from approximately about 63° C. to about 65° C. and held at this temperature for 3 minutes and treated with a solvent as aforesaid. The zinc hydrosulfite crystals are then removed from the concentrated mixture of the mother liquor by physical means such as filtration or centrifuging with subsequent decantation of the mother liquor. The crystals may then be washed with solvent until essentially all of the water remaining on the crystals is displaced. Only those water soluble solvents are used which do not react with or dissolve the zinc hydrosulfite crystals and which displace water from the zinc hydrosulfite crystals. Illustrative of solvents which can be used are lower aliphatic alcohols such as methanol, ethanol, propanol, isopropanol, butanol, etc. and mixtures thereof. Thereafter, the crystals are dried in any conventional manner.

It is readily apparent from the preceding description that the steps of the present process are related to each other in such a manner that the crystallization of zinc hydrosulfite can be practiced as a batch process. However, this invention is not to be construed as limited to a batch process; and, if desired, the sequence of steps disclosed herein can be practiced in a continuous manner, that is, as a continuous process with equally excellent results.

The advantages which flow from the practice of this invention are numerous. A particularly outstanding and valuable feature of the present invention is that the dusting and bridging effects of zinc hydrosulfite crystals heretofore produced are eliminated thus greatly enhancing the handling and use of zinc hydrosulfite. Also, this invention provides for a continuous as well as a batch method for preparing zinc hydrosulfite crystals which is both efficient and economical. It is efficient because of the high yields and high purity of the zinc hydrosulfite crystals produced thereby. It is economical in that the raw materials used are readily available and relatively quite inexpensive.

For a fuller understanding of the nature and objects of the invention and are not to be construed in a limiting amples which are given merely as a further illustration of the invention and are not to be construed in a limiting sense.

Example I

In this example 700 lbs. of zinc dust was dispersed by agitation in a reaction vessel containing 3640 lbs. of water and the resulting aqueous zinc dispersion was further agitated while sulfur dioxide gas, obtained from a sulfur burner, was liberated throughout the aqueous zinc solution until essentially all of the zinc was reacted with the sulfur dioxide and water to form zinc hydrosulfite. The resulting aqueous solution of zinc hydrosulfite had a pH of 4.0. The aqueous solution was then divided into two approximately equal portions and 100 lbs. of glycerine was added to one of the two approximately equal portions along with 6 lbs. of zinc dust; the approximate volume of each portion being 250 gallons. 50 gallons of water was removed at a constant rate from the first portion which was treated with glycerine and zinc dust over a period of 30 minutes. This was accomplished by heating and agitating the solution at a temperature ranging from 45° C. to 48° C. while maintaining a vacuum pressure about 68.4 cm. of mercury with a steamjet evacuator. The vacuum was then manipulated such that a rapid ascent of temperature was produced to about 68° C. where it was held for approximately three minutes. At this point the proper amount of seed crystals had then been formed. Further formation was arrested by the addition of 0.1 lb. of the colloidal additive in this case Separan NP–20, Dow Chemical Company, Midland, Michigan, which had previously been dissolved in water. The temperature was then decreased slowly (in not less than 7 minutes) to about 56° C. and held constant to within 1° C. for the remainder of the run.

The second part was treated with a like amount of the additive and was then added to the concentrated first part at a rate of 1.5 gallons per minute while 1.5 gallons per minute of water were constantly removed from the mixture of the two parts by heating and agitating the mixture of the two parts at a temperature held constant of approximately 56.5° C. while maintaining a vacuum pressure of about 68.4 cm. of mercury, with a steamjet evacuator. Upon completion of the addition of the second part of the solution to the concentrated first part of the solution, the resulting mixture had a volume of 200 gallons, that is, about 40% of the original volume. 30 gallons of proprietary solvent was then to the resulting mixture and the mixture filtered. The zinc hydrosulfite crystals obtained upon filtration were washed with 30 gallons, 80 gallons and 30 gallons of proprietary solvent respectively. Thereafter the crystals were dried in a vacuum oven to 50° C. at a vacuum pressure of about 28 inches of mercury. The dried crystals weighed 1900 lbs.

From this example, it is readily apparent that my invention provides for an improved and highly efficient method of crystallizing zinc hydrosulfite from aqueous solutions. This example illustrates the excellent yield of zinc hydrosulfite obtained when my process is employed. The zinc hydrosulfite crystals obtained in this example did not exhibit any tendency to cause severe dusting when violently agitated. Furthermore they demonstrated excellent flow properties when placed in a hopper.

*Example II*

In this example a two liter aqueous solution of zinc hydrosulfite (44.8% by weight of zinc hydrosulfite, based on the total weight of the solution) having a pH of 4.0 was prepared and filtered to remove any insoluble impurities. This solution was divided into two equal parts and 37.5 ml. of glycerine and 6.0 grams of zinc dust were admixed into one of the two equal portions. 200 ml. of water was removed from the portion containing the glycerine and zinc dust over a period of 20 minutes by heating the portion at a temperature which ranged from about 45° C. to about 48° C. while maintaining a vacuum pressure on the solution of about 64.8 cm. of mercury with an aspirator while the portion was constantly agitated.

The temperature of the concentrated portion was then adjusted to about 75° C. and held at this point for about 5 minutes. It was noted that seed crystals had formed in the concentrated portion; at this point. 0.07 gram of a polymer of hydroxyethyl cellulose (Cellosize QP 4400, sold by Union Carbide Chemical Company) was added to each portion of the aqueous solutions of zinc hydrosulfite and the temperature of the concentrated portion was adjusted evenly over a period of about 7 minutes until it was about 56.5° C.

The unconcentrated portion was then added to the concentrated portion at a rate of about 6.7 ml./minute while 6.7 ml. of water/minute was removed from the resulting admixture. The temperature of the admixture was maintained at about 56.5° C. during the addition and a vacuum pressure of about 64.8 cm. of mercury was maintained on the admixture to permit the removal of the water therefrom. The resulting admixture upon completion of the addition of the unconcentrated portion had a volume slightly over 800 ml. The resulting crystallized solution was filtered upon a Buchner funnel and the crystals recovered thereon were washed three times with 100 ml., 200 ml. and 100 ml. of ethanol respectively. The washed crystals were then dried in a vacuum flask at a temperature of 50° C. at a vacuum pressure of 71 cm. of mercury.

Microscopic examination of the dried crystals obtained in both examples given above disclosed that the product contained some spherical dendrites having a diameter of about 150 microns and which were composed of heavy needles which were rectangular on cross section having dimensions of 40 microns by 175 microns. All fines found present in the product were short and bulky as opposed to short and narrow fines found in similar products not produced utilizing my invention.

Visual and tactile inspection of the products produced in both example given above clearly exhibit that the flowability, low dustability, and consistency of the products produced therein were much superior to any of the products produced in the prior art.

Having described my invention what I claim as new and desire to secure by Letters Patent is:

1. A process for the production of zinc hydrosulfite crystals comprising dividing an aqueous solution of zinc hydrosulfite containing at least about 25 percent by weight of water based on the total weight of the solution into two approximately equal portions, introducing into the first portion at least about 2% by weight of glycerine, based on the weight of said zinc hydrosulfite in said first portion, from about 0.2% to about 0.8% by weight of zinc containing pH stabilizer, based on the weight of said zinc hydrosulfite in said first portion, and from about 0.005% to about 0.1% by weight of a crystal modifier selected from the group consisting of polymers of acrylamide, gum resins having a molecular weight ranging between from about 300,000 to about 9,000,000 and nonionic polymers of ethers of cellulose having a molecular weight ranging between from about 500,000 to about 4,000,000, based on the weight of said zinc hydrosulfite contained in said first portion and removing water from the said first portion at a rate of about ½% to about 1½% by volume per minute, based on the original volume of said first portion, by heating said portion at temperatures of from about 45° C. to about 75° C. at subatmospheric pressures until the volume of said first portion is equal to approximately 80% of the original volume of said first portion, introducing into the second portion from about 0.005% to about 0.1% by weight of a crystal modifier selected from the group consisting of polymers of acrylamide, gum resins having a molecular weight ranging between from about 300,000 to about 9,000,000 and nonionic polymers of ethers of cellulose having a molecular weight ranging between from about 500,000 to about 4,000,000, based on the weight of said zinc hydrosulfite contained in said second portion, adding said second portion to the resulting concentrated first portion at a rate equal to about 1½% to 1⅓% by volume per minute based on the original volume of said second portion while simultaneously removing water from the resulting admixture at a rate equal to the rate of addition of said second portion to said concentrated first portion, by heating said mixture at temperatures of from about 55° C. to about 75° C. in the resulting concentrated solution and drying said crystals.

2. A process for the production of zinc hydrosulfite crystals comprising dividing an aqueous solution of zinc hydrosulfite containing at least about 25 percent by weight of water based on the total weight of the solution into two approximately equal portions, introducing into the first portion at least about 2% by weight of glycerine, based on the weight of said zinc hydrosulfite in said first portion, from about 0.2% to about 0.8% by weight of a zinc containing pH stabilizer, based on the weight of said zinc hydrosulfite in said first portion and removing water from the said first portion at a rate of from about ½% to 1½% by volume per minute, based on the original volume of said first portion, by heating said portion at temperatures of from about 45° C. to about 75° C. at subatmospheric pressures until the volume of said first portion is equal to approximately 80% of the original volume of said first portion and introducing into the resultant concentrated first portion from about 0.005% to about 0.1% by weight of a crystal modifier selected from the group consisting of polymers of acrylamide, gum resins having a molecular weight ranging between from about 300,000 to about 9,000,000 and nonionic polymers of ethers of cellulose having a molecular weight ranging between from about 500,000 to about 4,000,000, based on the weight of said zinc hydrosulfite contained in said first portion, introducing into the second portion from about 0.005% to about 0.1% by weight of a crystal modifier, selected from the group consisting of polymers of acrylamide, gum resins having a molecular weight ranging between from about 300,000 to about 9,000,000 and nonionic polymers of ethers of cellulose having a molecular weight ranging between from about 500,000 to about 4,000,000, based on the weight of said zinc hydrosulfite contained in said portion, adding said second portion to the resulting concentrated first portion at a rate equal to about 1½% to 1⅓% by volume per minute based on the original volume of said second portion while simultaneously removing water from the resulting admixture at a rate equal to the rate of addition of said second portion to said concentrated first portion, by heating said mixture at temperatures of from about 55° C. to about 75° C. at subatmospheric pressures, separating zinc hydrosulfite crystals contained in the resulting concentrated solution and drying said crystals.

3. The process of claim 2, wherein the pH of said aqueous solution of zinc hydrosulfite is from about 3.6 to about 4.4.

4. The process of claim 3, wherein said aqueous solution of zinc hydrosulfite has a pH of about 4.0.

5. The process of claim 2, wherein said aqueous solution of zinc hydrosulfite contains from about 25 percent to about 65 percent by weight of water, based on the total weight of said solution.

6. The process of claim 5, wherein said solution contains from about 35 percent to about 50 percent by weight of water, based on the total weight of said solution.

7. The process of claim 2 wherein said first portion of said aqueous solution of zinc hydrosulfite is treated with about 10 percent by weight of glycerine based on the weight of said zinc hydrosulfite in said first portion.

8. The process of claim 2, wherein said first portion of said aqueous solution of zinc hydrosulfite is treated with about 0.4 percent by weight of a zinc containing pH stabilizer, based on the weight of said zinc hydrosulfite in said first portion.

9. The process of claim 2, wherein said water is removed from said first portion at a rate of about 0.66 percent by volume per minute, based on the original volume of said first portion.

10. The process of claim 2, wherein said second portion is added to said concentrated first portion at a rate of about 0.66 percent by volume per minute, based on the original volume of said second portion.

11. The process of claim 2, wherein said first portion of aqueous solution of zinc hydrosulfite is treated with about 0.01% by weight of crystal modifier based on the weight of said zinc hydrosulfite in said first portion.

12. The process of claim 2, wherein said second portion of aqueous solution of zinc hydrosulfite is treated with about 0.01% by weight of crystal modifier based on the weight of said zinc hydrosulfite in said second portion.

13. The process of claim 2, wherein said crystal modifier is a polymer of acrylamide having a molecular weight ranging from between about 500,000 to about 4,000,000.

14. The process of claim 2, wherein said crystal modifier is a polymer of acrylamide having a molecular weight of approximately 2,000,000.

15. The process of claim 2, wherein said crystal modifier is a polymer of hydroxyethylcellulose having a molecular weight of approximately 2,000,000.

16. The process of claim 11, wherein said crystal modifier is gum karaya.

17. The process of claim 11, wherein said crystal modifier is locust bean gum.

18. The process of claim 2, including the step of displacing residual water present in said zinc hydrosulfite crystals.

19. The process of claim 2, wherein the water in the zinc hydrosulfite crystals is displaced by washing said crystals with at least one member of the group consisting of methanol, ethanol, propanol and butanol.

20. A process for the production of zinc hydrosulfite crystals comprising dividing an aqueous solution of zinc hydrosulfite containing about 45 percent by weight of water, based on the total weight of said solution, into approximately two equal portions, introducing into the first portion about 10% by weight of glycerine, based on the weight of said zinc hydrosulfite in said first portion, about 0.4% by weight of a zinc containing pH stabilizer, and removing water from said first portion at a rate of about 0.66 percent by volume per minute, based on the original volume of said first portion by heating said portion at temperatures of from about 45° C. to 48° C. at subatmospheric pressures until the volume of said first portion is equal to approximately 80% of the original volume of said first portion, and introducing into the resultant concentrated first portion about 0.01% by weight of crystal modifier selected from the group consisting of polymers of arcylamide, gum resins having a molecular weight ranging between from about 300,000 to about 9,000,000 and nonionic polymers of ethers of cellulose having a molecular weight ranging from about 500,000 to about 4,000,000, based on the weight of said zinc hydrosufite contained in said first portion, and introducing into the second portion about 0.01% by weight of a crystal modifier selected from the group consisting of polymers of acrylamide, gum resins having a molecular weight ranging between from about 300,000 to about 9,000,000 and nonionic polymers of ethers of cellulose having a molecular weight ranging from about 500,000 to about 4,000,000, based on the weight of said zinc hydrosulfite contained in said second portion, adding said second portion to said concentrated first portion at a rate of about 0.66 percent by volume per minute, based on the original volume of said second portion, while simultaneously removing water from the resulting admixture at a rate equal to the rate of addition of said second portion to said concentrated first portion by heating said mixture at temperatures of from about 55° C. to about 57.5° C. at subatmospheric pressures, thereafter filtering said zinc hydrosulfite crystals contained in said concentrated mixture, washing said crystals with at least one member of the group consisting of methanol, ethanol, propanol and butanol until essentially all water is displaced from said crystals and drying said crystals.

References Cited by the Examiner

UNITED STATES PATENTS

| | | | |
|---|---|---|---|
| 1,950,459 | 3/34 | Seifert | 23—303 |
| 3,048,477 | 8/62 | Rogers | 23—300 |
| 3,095,281 | 6/63 | Schinkel | 23—300 |

FOREIGN PATENTS

| | | |
|---|---|---|
| 616,967 | 3/61 | Canada. |
| 10,771 | 1907 | Great Britain. |

OTHER REFERENCES

Crystallization, by Mullin, pages 128–133, London, Butterworths, 1961.

NORMAN YUDKOFF, *Primary Examiner.*

ANTHONY SCIMANNA, *Examiner.*